UNITED STATES PATENT OFFICE.

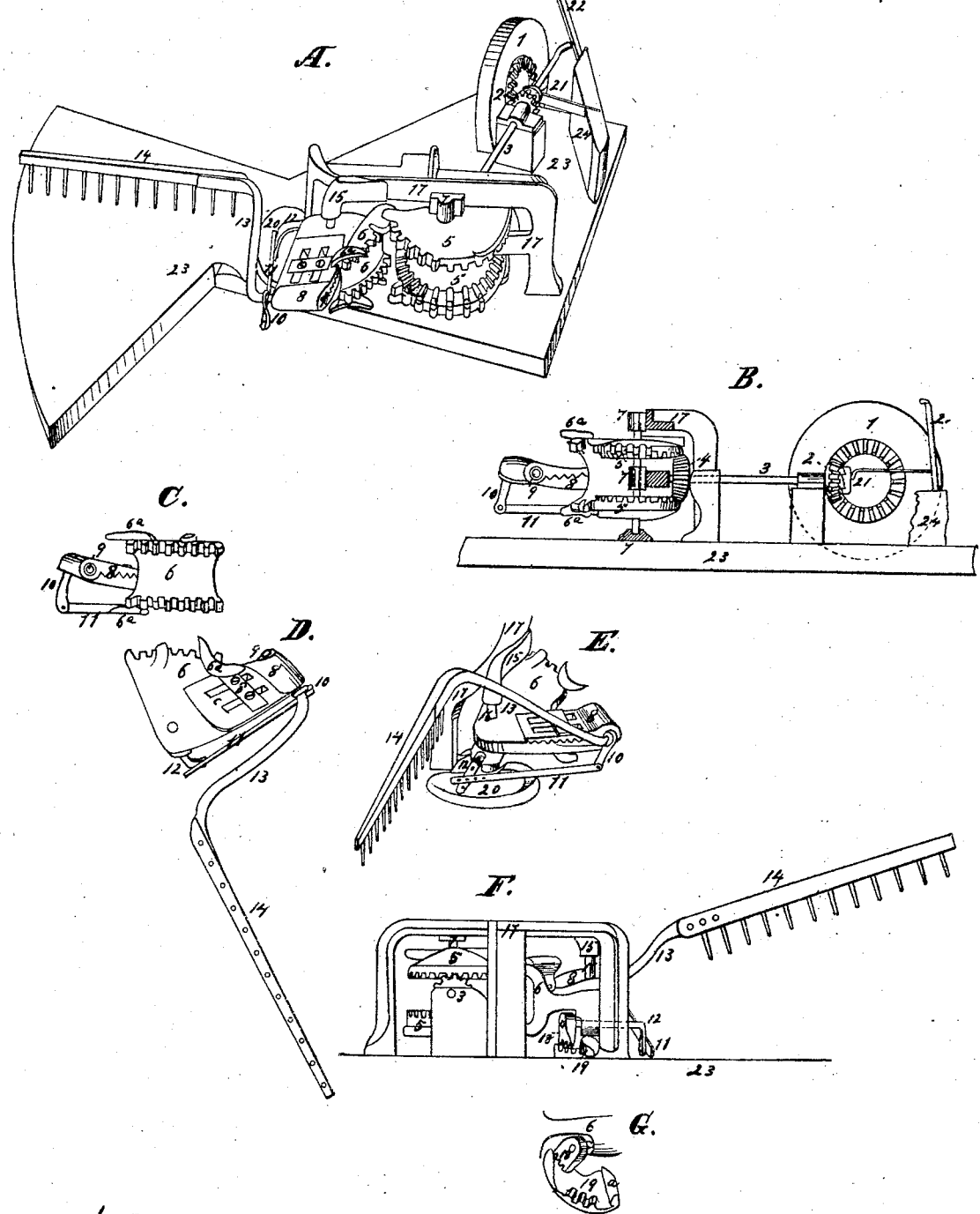

OLE O. STORLE, OF NORTH CAPE, WISCONSIN.

IMPROVEMENT IN HARVESTER-RAKES.

Specification forming part of Letters Patent No. 55,551, dated June 12, 1866.

*To all whom it may concern:*

Be it known that I, OLE O. STORLE, of North Cape, in the county of Racine and State of Wisconsin, have invented a new and useful Improved Self-Rake Attached to Reapers; and I do hereby declare that the following is a full, clear, and exact description of the construction and operation of the same, reference being had to the annexed drawings, making a part of this specification, in which—

Figure A is a perspective view; Fig. B, a longitudinal elevation; Fig. C, an elevation showing the construction of the double-cog segmental wheel No. 6 and its connection with the rake-regulator No. 8; Fig. D, a ground plan of the same; Fig. E, a perspective view, showing the construction and operation of the rake-regulator; Fig. F, a transverse view; Fig. G, a perspective view of guide-wheel and guide-track, located under the rake-regulator and double-cog segmental wheel.

The rake is operated from the main shaft of the reaper's drive by a cast-iron cog-wheel attached to or cast on the side of the same. (See No. 1.) This is connected with the small beveled cog-wheel No. 2, which is fastened on the iron shaft No. 3. At the other end of this shaft is a similar cog-wheel, No. 4, (see Diagram B,) which gives motion to the reverse-acting circular cog-wheels Nos. 5 5, Diagrams A, B, and F. These two wheels revolve on the same vertical axis, the axle being held in its position by the boxes Nos. 7 7 7, Diagrams A, B, and F.

The cogs on the reverse-acting cog-wheels Nos. 5 5 are so constructed and placed on their axis that when the upper wheel connects with the upper cogs of the segmental wheel No. 6 and gives the latter its motion, that the rake may throw off the bundle of grain or gavel, the lower wheel revolves without connecting with the segmental wheel No. 6 until the upper wheel completes its work and throws off the gavel. Then the lower circular wheel catches in the lower cogs of the segmental wheel and gives the rake the return motion for another gavel. At the same time the upper circular wheel revolves without connecting with the upper cogs of the segmental wheel until the backward motion given to the rake by the lower wheel ceases.

The segmental wheel No. 6 is connected with and forms part of the rake-regulator No. 8. The latter, with its accompanying parts, Nos. 10 11 12 and 18 and 19, regulates the height of the rake as may be required by shortening or lengthening the stroke of the connecting-rod No. 11 by the pin connecting it with the shoulder of the guide-wheel axle No. 12. The speed of the rake is also regulated by the number of cogs on the circular wheels Nos. 5 5, which allows the rake to remain idle one-third of the time, (or of one revolution of the wheels Nos. 5 5,) that the reaper may cut sufficient grain before the rake returns for another gavel. The axle of the guide-wheel slips backward and forward in its socket, that the guide-wheel No. 18 may return through the groove in the guide-track or traverse the cogs on the outer edge of the latter. (See Diagram G.) As the rake returns for a gavel of grain the guide cog-wheel No. 18, by traversing the cogs of the guide-track, elevates the rake-head, and when the latter reaches its proper position the guide-wheel drops off the cogs of the track into the groove of the latter, and at the same time the rake drops on the gavel. As the rake proceeds with its load the guide-wheel slips through the groove of the guide-track No. 19, and when the guide-wheel reaches the shoulder *a* of the guide-track the shoulder presses the wheel over on the cogs, that the rake may be raised for another gavel.

Attached to the small cog-wheel No. 2 and on the outer end of the shaft No. 3 is a small spur-wheel, No. 21, forming part of the shifting-gear, and is for the purpose of throwing the rake out of gear and stopping its motion at pleasure. This spur-wheel No. 21 has on its inner diameter four spurs or teeth connecting it with a like number on the outer side of the cog-wheel No. 2. The handle No. 22 of the shifting-gear is connected with the spur-wheel 21 by an iron rod. When the handle is pressed back it disconnects the spur-wheel from the cog-wheel No. 2 and throws the rake out of gear. When the handle is allowed to resume its first position the spur-wheel springs to its place against the cog-wheel No. 2, and by so doing enables the rake to resume its motion.

The spur-wheel No. 21 has a square mortise through its center, and the end of the shaft No. 3 is also square where it connects with the spur-wheel, that the latter may move backward and forward, but not turn without turning the shaft. No. 23, reaper-platform. Motion is given by the large reaper-wheel No. 1 to the spur and cog wheels Nos. 21 and 2, then by the shaft No. 3 to the cog-wheels Nos. 5 5, by these, to the segmental wheel No. 6,

What I claim as my improvement, and wish to secure by Letters Patent, is—

1. Bevel-wheels No. 5 and segmental wheels No. 6 and pinion No. 4, in combination, constructed and operated substantially as and for the purpose described.

2. Guide-wheel No. 18, in combination with guide-track No. 19 and rake No. 14, substantially as and for the purpose described.

OLE O. STORLE.

In presence of—
ELIZABETH DROUGHT,
GUSTAVUS A. FIELD.